(12) United States Patent
Bakker

(10) Patent No.: US 10,779,255 B2
(45) Date of Patent: *Sep. 15, 2020

(54) MANAGING LOCAL EMERGENCY NUMBERS

(71) Applicant: BlackBerry Limited, Waterloo (CA)

(72) Inventor: Jan Hendrik Lucas Bakker, Fort Worth, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/750,963

(22) Filed: Jan. 23, 2020

(65) Prior Publication Data

US 2020/0205110 A1  Jun. 25, 2020

Related U.S. Application Data

(63) Continuation of application No. 16/383,268, filed on Apr. 12, 2019.

(60) Provisional application No. 62/735,958, filed on Sep. 25, 2018.

(51) Int. Cl.

| | | |
|---|---|---|
| *H04W 4/00* | (2018.01) | |
| *H04W 60/06* | (2009.01) | |
| *H04W 76/25* | (2018.01) | |
| *H04W 4/90* | (2018.01) | |
| *H04W 76/50* | (2018.01) | |
| *H04W 8/08* | (2009.01) | |

(Continued)

(52) U.S. Cl.
CPC ............ *H04W 60/06* (2013.01); *H04W 4/90* (2018.02); *H04W 8/08* (2013.01); *H04W 76/25* (2018.02); *H04W 76/50* (2018.02); *H04W 88/023* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 2004/0228347 A1* | 11/2004 | Hurtta | H04W 76/12 370/395.2 |
| 2014/0287711 A1 | 9/2014 | Williams et al. | |
| 2016/0100045 A1 | 4/2016 | Raja et al. | |

(Continued)

OTHER PUBLICATIONS

3GPP TS 22.101 V16.1.0; 3rd Generation Partnership Project; Technical Specification Group Services and System Aspects; Service Aspects; Service Principles; Release 16; Sep. 2018; 104 pages.

(Continued)

*Primary Examiner* — Gerald A Smarth
(74) *Attorney, Agent, or Firm* — Conley Rose, P.C.; J. Robert Brown, Jr.; Joseph J. Funston, III

(57) ABSTRACT

Described herein is a system and method in a user equipment (UE) supporting registration using third generation partnership project (3GPP) access and using non-3GPP access, the method comprising storing, in a memory of the UE, first emergency information received using first registration procedures; receiving, by the UE, a REGISTRATION ACCEPT message using second registration procedures via non-3GPP access; and keeping, in the memory, the first emergency information after receiving the REGISTRATION ACCEPT message.

20 Claims, 9 Drawing Sheets

(51) Int. Cl.
*H04W 88/02* (2009.01)
*H04W 84/04* (2009.01)

(56) References Cited

U.S. PATENT DOCUMENTS

| | | | |
|---|---|---|---|
| 2016/0226922 A1* | 8/2016 | Russell | H04L 65/1016 |
| 2017/0332416 A1* | 11/2017 | Kiss | H04L 61/304 |
| 2018/0227866 A1* | 8/2018 | Jung | H04W 56/001 |
| 2018/0367998 A1* | 12/2018 | Kunz | H04W 12/12 |
| 2020/0100202 A1 | 3/2020 | Bakker | |

OTHER PUBLICATIONS

3GPP TS 23.003 V15.6.0; 3rd Generation Partnership Project; Technical Specification Group Core Network and Terminals; Numbering, Addressing and Identification; Release 15; Dec. 2018; 129 pages.
3GPP TS 23.038 V15.0.0; 3rd Generation Partnership Project; Technical Specification Group Core Network and Terminals; Alphabets and Language-Specific Information; Release 15; Jun. 2018; 56 pages.
3GPP TS 23.167 V15.4.0; 3rd Generation Partnership Project; Technical Specification Group Services and System Aspects; IP Multimedia Subsystem (IMS) Emergency Sessions; Release 15; Dec. 2018; 64 pages.
3GPP TS 23.501 V16.0.2; 3rd Generation Partnership Project; Technical Specification Group Services and System Aspects; System Architecture for the 5G System; Stage 2; Release 16; Apr. 2019; 317 pages.
3GPP TS 24.002 V15.0.0; 3rd Generation Partnership Project; Technical Specification Group Core Network and Terminals; GSM-UMTS Public Land Mobile Network (PLMN) Access Reference Configuration; Release 15; Jun. 2018; 11 pages.
3GPP TS 24.008 V16.0.0; 3rd Generation Partnership Project; Technical Specification Group Core Network and Terminals; Mobile Radio Interface Layer 3 Specification; Core Network Protocols; Stage 3; Release 16; Mar. 2019; 793 pages.
3GPP TS 24.229 V16.1.0; 3rd Generation Partnership Project; Technical Specification Group Core Network and Terminals; IP Multimedia Call Control Protocol based on Session Initiation Protocol (SIP) and Session Description Protocol (SDP); Stage 3; Release 16; Mar. 2019; 1043 pages.
3GPP TS 24.301 V16.0.0; 3rd Generation Partnership Project; Technical Specification Group Core Network and Terminals; Non-Access-Stratum (NAS) Protocol for Evolved Packet System (EPS); Stage 3; Release 16; Mar. 2019; 540 pages.
3GPP TS 24.501 V15.2.1; 3rd Generation Partnership Project; Technical Specification Group Core Network and Terminals; Non-Access-Stratum (NAS) Protocol for 5G System (5GS); Stage 3; Release 15; Jan. 2019; 455 pages.
3GPP TS 27.007 V16.0.0; 3rd Generation Partnership Project; Technical Specification Group Core Network and Terminals; AT Command Set for User Equipment (UE); Release 16; Mar. 2019; 390 pages.

3GPP TS 31.102 V15.5.0; 3rd Generation Partnership Project; Technical Specification Group Core Network and Terminals; Characteristics of the Universal Subscriber Identity Module (USIM) Application; Release 15; Mar. 2019; 311 pages.
ISO; "Codes for the Representation of Names of Languages—Part 1: Alpha-2 Code"; ISO 639-1; Jul. 15, 2002; 46 pages.
ISO; "Codes for the Representation of Names of Languages—Part 2: Alpha-3 Code"; ISO 639-2; Nov. 1, 1998; 74 pages.
ISO/IEC; "Information Technology—Universal Coded Character Set (UCS)"; ISO/IEC 10646; Dec. 2017; 2702 pages; (Part 1: pp. 1-532).
ISO/IEC; "Information Technology—Universal Coded Character Set (UCS)"; ISO/IEC 10646; Dec. 2017; 2702 pages; (Part 2: pp. 533-768).
ISO/IEC; "Information Technology—Universal Coded Character Set (UCS)"; ISO/IEC 10646; Dec. 2017; 2702 pages; (Part 3: pp. 769-1002).
ISO/IEC; "Information Technology—Universal Coded Character Set (UCS)"; ISO/IEC 10646; Dec. 2017; 2702 pages; (Part 4: pp. 1003-1502).
ISO/IEC; "Information Technology—Universal Coded Character Set (UCS)"; ISO/IEC 10646; Dec. 2017; 2702 pages; (Part 5: pp. 1503-2702).
Rosenberg, J., et al.; "SIP: Session Initiation Protocol"; RFC 3261; Jun. 2002; 232 pages.
Schulzrinne H.; "A Uniform Resource Name (URN) for Emergency and Other Well-Known Services"; RFC 5031; Jan. 2008; 15 pages.
BLACKBERRY UK LTD.; "Allowing Local Emergency List to be Populated by non-3GPP Access"; C1-171444; 3GPP TSG-CT WG1 Meeting #103; Spokane, WA; Apr. 3-7, 2017; 19 pages.
Intel, et al.; "Managing Local Emergency Number Over the non-3GPP Access"; C1-1702399; 3GPP TSG-CT WG1 Meeting #104; Zhangjiajie, China; May 15-19, 2017; 9 pages.
Huawei, et al.; "Clarifications on Registration and Deregistration"; C1-182032; 3GPP TSG-CT WG1 Meeting #110; Kunming, China; Apr. 16-20, 2018; 5 pages.
BLACKBERRY UK LTD.; "Introduction of Handling of Emergency Call Number ANQP-element"; C1-170603; 3GPP TSG-CT WG1 Meeting #102; Dubrovnik, Croatia; Feb. 13-17, 2017; 8 pages.
BLACKBERRY UK LTD.; "Handling of Local Emergency Numbers Issues (alt 2)"; C1-174732; 3GPP TSG-CT WG1 Meeting #107; Reno, USA; Nov. 27-Dec. 1, 2017; 5 pages.
BLACKBERRY UK LTD.; "Handling of Local Emergency Numbers Issues"; C1-174711; 3GPP TSG-CT WG1 Meeting #107; Reno, USA; Nov. 27-Dec. 1, 2017; 3 pages.
Deutsche Telkom; "NAS Emergency Number Lists"; C1-180105; 3GPP TSG-CT WG1 Meeting #108; Gothenburg, Sweden; Jan. 22-26, 2018; 6 pages.
Ericsson, et al.; "Downloading of Local Emergency Numbers to the Mobile Station"; NP-020674; 3GPP TSG-CN Meeting #18; New Orleans, USA; Dec. 4-6, 2002; 15 pages.
PCT International Search Report & Written Opinion of the International Searching Authority; Application No. PCT/EP2019/059100; dated Jun. 25, 2019; 14 pages.
PCT Partial Search Report; Application No. PCT/EP2019/063155; dated Jul. 11, 2019; 17 pages.

* cited by examiner

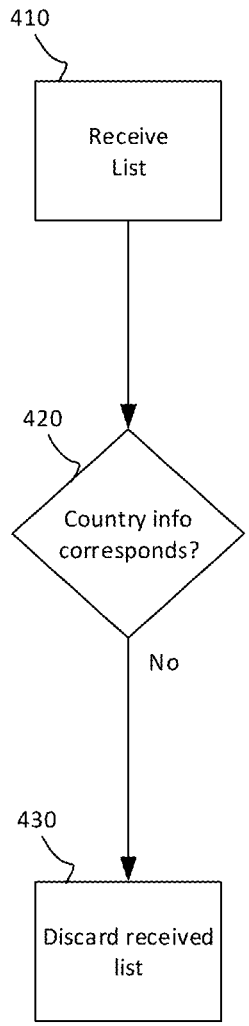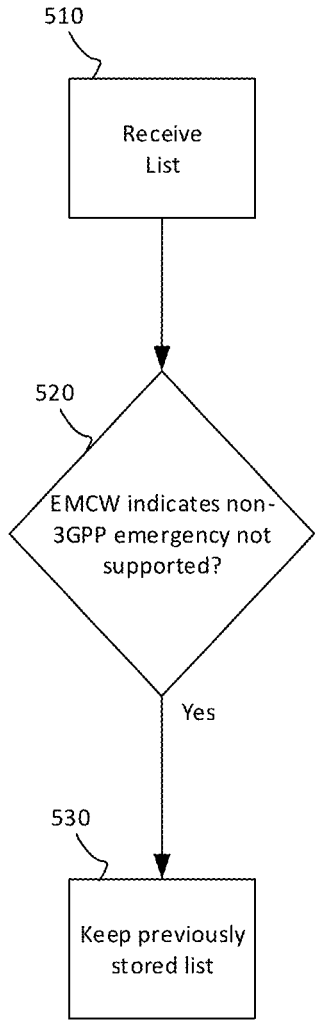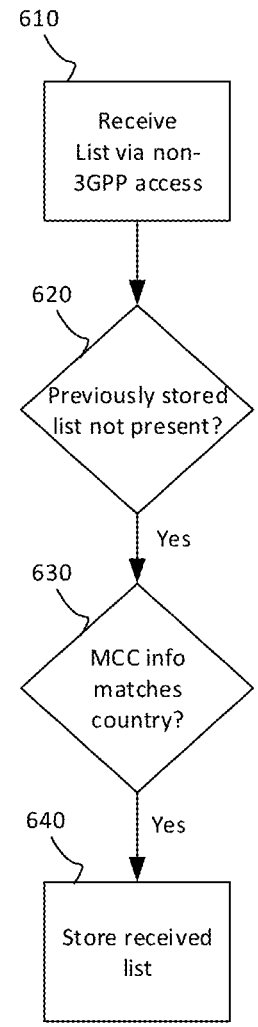
FIG. 4
FIG. 5
FIG. 6

MANAGING LOCAL EMERGENCY NUMBERS

CROSS-REFERENCE TO RELATED APPLICATIONS

This application is a continuation of U.S. patent application Ser. No. 16/383,268 filed Apr. 12, 2019 by Jan Hendrik Lucas Bakker entitled, "Managing Local Emergency Numbers", which claims priority to U.S. Provisional Application No. 62/735,958 filed Sep. 25, 2018 by Jan Hendrik Lucas Bakker entitled, "Managing Local Emergency Numbers", both of which are incorporated by reference herein as if reproduced in their entirety.

BACKGROUND

As used herein, the term "user equipment" (alternatively "UE") might in some cases refer to mobile devices or wireless devices such as mobile telephones, personal digital assistants, handheld, laptop computers or personal computers, and similar devices that have telecommunications capabilities, including text and email functionality. The terms UE, mobile device, and wireless device may be used interchangeably herein. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any component that can terminate a communication session for a user. Also, the terms "user equipment," "UE," "user agent," "UA," "user device," and "mobile device" might be used synonymously herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a flow diagram of another embodiment of an emergency number storage method.

FIG. 5 is a flow diagram of another embodiment of an emergency number storage method.

FIG. 6 is a flow diagram of another embodiment of an emergency number storage method.

DESCRIPTION

Figure 1:
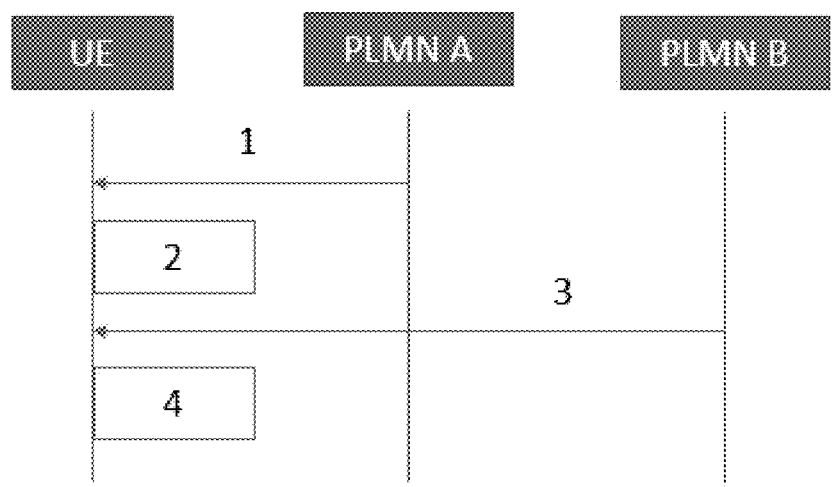
FIG. 1 is a diagram of an embodiment of a system for managing local emergency numbers.

An emergency call or session is a special type of call or session. It usually has a higher priority than other calls in a network, its bearers have different characteristics than other calls, e.g., the bearers could have one or more of a higher priority or higher Quality of Service (QoS). In situations of congestion other non-emergency calls may be released to allow an emergency call to be made or to continue. Emergency calls are usually made to extensively published or advertised numbers in a country or area e.g., 110, 000, 112, 911, 999, etc. Emergency calls can be terminated at special facilities called Public Safety Access Points (PSAPs). In $3^{rd}$ Generation Partnership Project (3GPP) systems, emergency calls are described in 3GPP TS 23.167 and 3GPP TS 22.101.

Emergency numbers may be region or country specific. Local users of a communication system are usually familiar with the emergency numbers in their local system. However, roaming users may not be familiar with them. Some countries introduce emergency numbers at a fast rate. For example, France has added 6 emergency services in the last 10 years. In order to ensure the correct characteristics are applied when a call is made to the emergency number, a list of emergency numbers may be stored at the user equipment (UE). The list of emergency numbers may be received by a UE during registration with a public land mobile network (PLMN). A PLMN is a wireless communication network that facilitates communication by a UE. A UE may be registered with one or more PLMNs at a given time. Registration may occur via one or more access technologies, for example, 3GPP access technologies and non-3GPP access technologies. 3GPP access technologies include but are not limited to E-UTRA (Evolved Universal Terrestrial Radio Access), General Packet Radio Services (GPRS), Long Term Evolution (LTE), and Next Generation Radio Access Network (NG-RAN). NG-RAN is a radio access network that supports one or more of the following options with the common characteristics that it connects to 5GC: 1) Standalone new radio (NR); 2) NR is the anchor with E-UTRA extensions; 3) Standalone E-UTRA; or 4) E-UTRA is the anchor with NR extensions. Non-3GPP access technologies include but are not limited to wireless local area networks (WLAN).

Registering with a PLMN may include various messages depending on the access technology used for accessing the PLMN or the core network supported by the access network. Examples of core networks are EPC (Evolved Packet Core) and 5GC (5G Core). Furthermore, the E-UTRA is an access that can be used to access the EPC or the 5GC. As used herein registering includes, but is not limited to, registering the UE's presence by means of a location registration, an attach procedure in the evolved packet system (EPS) (the EPS includes the EPC and the E-UTRAN), or a registration procedure in the 5G system (5GS) (the 5GS includes the 5GC and e.g. the NG-RAN). A UE which is attached via the E-UTRA network (E-UTRAN) may perform location registration by using the tracking area update procedure. The tracking area update procedure may include the UE sending a TRACKING AREA UPDATE request and receiving a TRACKING AREA UPDATE ACCEPT message. The attach procedure may include the UE sending an ATTACH REQUEST message and receiving an ATTACH ACCEPT message. A UE which is registered with the 5GC—via the NR, E-UTRA or a non-3GPP access such as WLAN—may perform the registration procedure. The registration procedure may include the UE sending a REGISTRATION REQUEST message and receiving a REGISTRATION ACCEPT message.

Registration procedures for a UE may be governed by non-access stratum (NAS) procedures. NAS procedures in a 5G system may be used for mobility management between the UE and the access and mobility management function (AMF) for both 3GPP access and non-3GPP access, and for session management between the UE and the session management function (SMF) for both 3GPP access and non-3GPP access. The 5GS mobility management (5GMM) protocol provides procedures for the control of mobility when the UE is using the next generation (NG) radio access network (NG-RAN) and/or non-3GPP access network. The NAS procedures are typically common for both 3GPP access and non-3GPP access. These procedures (e.g. as part of the 5GMM protocol and procedures) include the registration procedures (including the registration procedure for mobility and periodic registration update and the registration procedure for initial registration). NOTE: while SIP also includes a registration procedure, the SIP message causing registration with a SIP registrar is a SIP REGISTER message. Throughout this document, when registration is mentioned, it refers to the process of registration with a core network and not to the SIP registration procedure (unless this is explicitly indicated).

NAS procedures in an EPS include protocols for mobility management and session management used between the UE and Mobility Management Entity (MME) in the EPS. The EPS Mobility Management (EMM) protocol provides procedures for the control of mobility when the UE is using the Evolved UMTS Terrestrial Radio Access Network (E-UTRAN). The EMM protocol also provides control of security for the NAS protocols. These NAS procedures (in EPS) apply to 3GPP access only. These procedures (e.g. as part of the EMM protocol and procedures) include the attach procedures and the tracking area updating procedures.

The emergency information provided to a UE during registration may include one or both of an extended local emergency numbers list and a local emergency numbers list. The local emergency numbers list may be used on the circuit switched (CS) domain and for example, may be encoded to include "categories" (a category identifies an emergency service using bits rather than URNs or a concatenation of URN labels). The extended local emergency numbers list does not include categories and the information in it may typically not be included in CS emergency call setup messages when the UE is using the CS domain. A PLMN may provide this emergency information via non-3GPP access or via 3GPP access. A UE may register with two or more different PLMNs or more than once with the same PLMN, via either non-3GPP access or 3GPP access. Consequently, the UE may be connected to, registered with, or attached to one PLMN or two different PLMNs simultaneously via the two different accesses at a given time. For example, if a UE is in a home location, the UE may register with a home PLMN via both 3GPP access and non-3GPP access. In contrast, while traveling abroad, the UE may register with a home PLMN via non-3GPP access and a foreign (or visited country's) PLMN via 3GPP access.

A PLMN may send an extended local emergency numbers list in a REGISTRATION ACCEPT message, an ATTACH ACCEPT message, or in a TRACKING AREA UPDATE ACCEPT message. Other message types may be used to transmit the extended local emergency numbers list. The Extended emergency number list may be sent in an information element (IE). The purpose of this information element is to encode one or more local emergency number(s) together with a sub-services field containing zero or more sub-services of the associated emergency service URN and a validity indication. An emergency service URN is a service URN with top level service type of "sos". An example information element is provided in table 1.

TABLE 1

| 8 | 7 | 6 | 5 | 4 | 3 | 2 | 1 | |
|---|---|---|---|---|---|---|---|---|
| Extended Emergency Number List IE ||||||||  octet 1 |
| Length of Extended Emergency Number List IE contents |||||||| octet 2 |
| |||||||| octet 3 |
| 0 | 0 | 0 | 0 | 0 | 0 | 0 | EENLV | octet 4 |
| | | | spare | | | | | |
| Length of $1^{st}$ Emergency Number information (Note 1) |||||||| octet 5 |
| Number digit 2 |||| Number digit 1 |||| octet 6 |
| |||||||| (Note 2) |
| Number digit 4 |||| Number digit 3 |||| octet 7* |
| . |||| . |||| . |
| . |||| . |||| . |
| . |||| . |||| . |
| (Note 3) |||| . |||| octet j − 1* |
| Length of 1st sub-services field (Note 4) |||||||| octet j |
| sub-services field |||||||| octet j + 1* |
| |||||||| (Note 5) |
| |||||||| octet k − 1* |
| Length of $2^{nd}$ Emergency Number information (Note 1) |||||||| octet k* |
| Number digit 2 |||| Number digit 1 |||| octet k + 1* |
| |||||||| (Note 2) |
| Number digit 4 |||| Number digit 3 |||| octet k + 2* |
| . |||| . |||| . |
| . |||| . |||| . |
| (Note 3) |||| . |||| octet l − 1* |
| . |||| . |||| |
| Length of $2^{nd}$ sub-services field (Note 4) |||||||| octet l* |
| sub-services field |||||||| octet l + 1* |
| |||||||| (Note 5) |
| |||||||| octet m − 1* |
| Length of $3^{rd}$ Emergency Number information (Note 1) |||||||| octet m* |
| Number digit 2 |||| Number digit 1 |||| octet m + 1* |
| |||||||| (Note 2) |
| Number digit 4 |||| Number digit 3 |||| octet m + 2* |
| . |||| . |||| . |
| . |||| . |||| . |
| (Note 3) |||| . |||| octet n − 1* |
| . |||| . |||| |
| Length of $3^{rd}$ sub-services field (Note 4) |||||||| octet n* |
| sub-services field |||||||| octet n + 1* |
| |||||||| (Note 5) |
| |||||||| octet o* |

NOTE 1:
The length may contain the number of octets used to encode the number digits.
NOTE 2:
The number digit(s) in octet 6 precedes the digit(s) in octet 7 etc. The number digit, which would be entered first, is located in octet 7, bits 1 to 4.
NOTE 3:
If the emergency number contains an odd number of digits, bits 5 to 8 of the last octet of the respective emergency number may be filled with an end mark coded as "1111".
NOTE 4:
The length may contain the number of octets used to encode the sub-services field.
NOTE 5:
The first character starts in octet j + 1, l + 1 or n + 1.

The IE in table 1 includes three emergency number information entries. Any number of emergency number information entries may be provided in the IE within the constraints of the maximum size of an IE or other limitations defined in relevant specifications. The extended local emergency numbers list may be valid in networks in the same country as the cell on which this IE is received or may be valid in the PLMN where it is received. The emergency information includes a validity indication (for example, one or more bit in octet 4 of Table 1. In this example, the bit is named EENLV. The validity indication may take the value 1 or 0 (see table 2)) indicating the validity of the extended local emergency numbers list e.g. valid for the current PLMN only or valid for the current country of the PLMN. Table 2 provides a sample validity indication.

TABLE 2

Extended Emergency Number List Validity (EENLV) (octet 4)

Bit 1

| | |
|---|---|
| 0 | Extended Emergency Number List is valid in networks in the same country as the cell on which this IE is received |
| 1 | Extended Emergency Number List is valid in the PLMN where it is received |

In some embodiments, emergency calls initiated at a UE are preferably initiated via 3GPP access. For example, 3GPP access may provide more reliable location services than non-3GPP access. Additionally, 3GPP networks may provide more extensive coverage compared to non-3GPP networks such as WLAN. More extensive coverage suits mobile users making emergency calls. In some embodiments, a UE may receive an indication from a PLMN indicating whether emergency services are supported over non-3GPP access via an IE, for example, a 5GS network feature support IE.

At present as described in 3GPP TS 24.501, the extended local emergency number list stored in the UE is replaced on each receipt of the extended emergency number list IE. This may result in the UE storing an extended local emergency number list that is not appropriate for the area where the UE is presently located. For example, the UE may register with a foreign PLMN via a 3GPP network in a foreign country and receive the extended local emergency number list for the foreign country. Subsequently, the UE may register with a home PLMN in a different country than where the UE currently is located via a non-3GPP network. In this case, the UE may receive and store an extended local emergency number list for the home PLMN, even though the UE is located in the foreign (different) country. The extended local emergency numbers list stored in the UE is discarded depending on the validity of the stored extended emergency number list. If the stored extended emergency number list is valid for a country, the list is discarded when the UE detects it is in a different country. If the stored extended emergency number list is valid for a PLMN, the list is discarded when the UE detects it is in a different PLMN. Validity may be determined based upon the validity indication shown in Table 2. The local emergency numbers list and the extended local emergency numbers list may be deleted at switch off and removal of the USIM. The UE can store up to ten entries in the local emergency numbers list and up to twenty entries in the extended local emergency numbers list, received from the PLMN. It may be desirable to include logic at the UE to determine whether or not a received extended local emergency number list should be stored or discarded.

At present as described in 3GPP TS 24.301, the local emergency numbers list and the extended local emergency numbers list contain additional local emergency numbers used by the serving network. These lists may be downloaded by the network to the UE at successful registration and subsequent registration updates. There is only one local emergency numbers list and only one extended local emergency numbers list in the UE. The local emergency numbers list can be updated with EMM procedures if the UE is in S1 mode, with GMM and MM procedures if the UE is in A/Gb or Iu mode, and with 5GMM procedures, if the UE is in N1 mode. The extended local emergency numbers list can be updated with EMM procedures if the UE is in S1 mode and with 5GMM procedures, if UE is in N1 mode. The UE may use the stored local emergency numbers list and the stored extended local emergency numbers list received from the network in addition to the emergency numbers stored on the USIM or user equipment to detect that the number dialed is an emergency number. If the UE determines that the number dialed is an emergency number, procedures are utilized to select a domain for the emergency session attempt. If the domain selected for the emergency session attempt is the PS domain, then the UE may perform the session establishment procedures using SIP (Session Initiation Protocol) to initiate an emergency session. If the domain selected for the emergency session attempt is the CS domain, then the UE may use the stored local emergency numbers list, in addition to the emergency numbers stored on the USIM and the ME, to determine if the call control entity of the UE is to send an EMERGENCY SETUP message or a SETUP message to the network. The network may send a local emergency numbers list or an extended local emergency numbers list or both, in the ATTACH ACCEPT or in the TRACKING AREA UPDATE ACCEPT messages by including the emergency number list IE and the extended emergency number list IE, respectively. The UE may store the local emergency numbers list and the extended local emergency numbers list, as provided by the network. The local emergency numbers list stored in the user equipment may be replaced on each receipt of the emergency number list IE. The extended local emergency numbers list stored in the user equipment may be replaced on each receipt of the extended emergency number list IE. The received local emergency numbers list or the received extended local emergency numbers list or both may be provided to the upper layers. The emergency number(s) received in the emergency number list IE and the extended emergency number list IE are valid only in networks in the same country as the cell on which this IE is received. If no local emergency numbers list or extended local emergency numbers list is contained in the ATTACH ACCEPT or in the TRACKING AREA UPDATE ACCEPT message, then the stored local emergency numbers list or the extended local emergency numbers list, respectively, in the user equipment may be kept, except if the user equipment has successfully registered to a PLMN in a country different from that of the PLMN that sent the list. The local emergency numbers list and the extended local emergency numbers list may be deleted at switch off and removal of the USIM. The UE may be able to store up to ten entries in the local emergency numbers list and up to twenty entries in the extended local emergency numbers list, received from the network.

As described above, a UE can connect to two different PLMNs via different accesses, resulting in the UE being registered at two different PLMNs simultaneously. In FIG. 1, the UE may receive first emergency information in step 1 while registering with PLMN A. Subsequently at step 3, the UE may receive second emergency information. The first emergency information may be the same or different than the second emergency information. In blocks 2 and 4 the UE needs to decide whether to store, overwrite, replace, clear, or discard received or stored emergency information. In block 4, emergency information stored in block 2, may be overwritten, replaced, cleared or discarded. At present, if the extended local emergency numbers list is not received in step 3, the presently stored extended local emergency numbers list on the UE may not be kept; it may be cleared, removed from memory, discarded or the list's length may be set to zero. Subsequently at step 4, the UE may then fail to detect an emergency call number, which may cause failure to obtain emergency services or delay in requesting emergency services.

Alternatively, the stored extended local emergency numbers list on the UE received from PLMN A at step 1 may be overwritten with extended local the emergency numbers list from PLMN B received via non-3GPP access at step 3. Subsequently at step 4, the UE may attempt to contact an emergency call number from the wrong PLMN (PLMN B), which may cause failure to obtain emergency services or delay in requesting emergency services. In some cases, PLMNs in the same country may provide different emergency information, e.g. in cases where the extended emergency number list is valid only in the PLMN where it is received (see discussion of "validity indication" herein). In other cases, PLMN B may be a PLMN of a different country with respect to the country the UE is in. It may be desirable to include logic at the UE to determine whether or not a received extended local emergency number list should be stored or discarded.

In the following embodiments, an indication of the access via which the extended local emergency numbers list or emergency information is received may be stored. This indication of the access may be stored together with the stored extended local emergency numbers. Alternatively, the extended local emergency numbers received in a message via non-3GPP access may be stored in a list that is separate from the list that stored the extended local emergency numbers received via 3GPP access.

In a first embodiment, an extended local emergency numbers list stored in the user equipment may be replaced on each receipt of an extended emergency number list IE, unless the extended local emergency numbers list stored in the user equipment has been received via 3GPP access and the stored extended local emergency numbers list is valid in the PLMN where it is received; the received extended emergency number list IE is received over non-3GPP access; and the PLMN registered via non-3GPP access is different from the PLMN from which the stored extended local emergency numbers list has been received.

Figure 2:
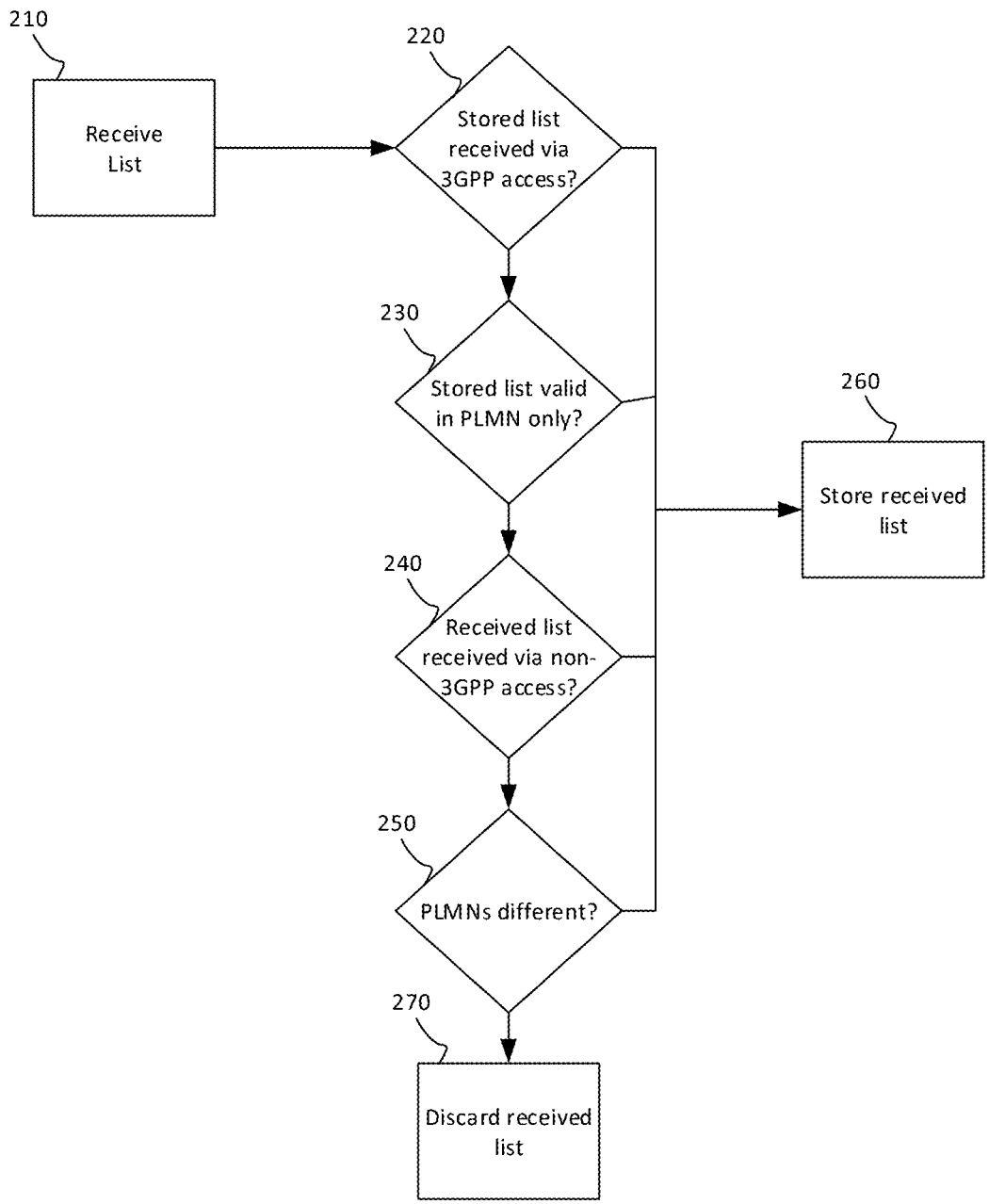
FIG. 2 is a flow diagram of an embodiment of an emergency number storage method.

FIG. 2 provides a flowchart of an alternative of the first embodiment. The flow begins at step 210 when an extended local emergency numbers list is received. The following four conditions 220, 230, 240, 250 may be determined in any order, and one or more of these conditions must be met in order to store the received list at step 260 or replace or overwrite the stored list with the received list. Otherwise, the received list may be discarded at step 270 or stored separate from the stored list. 1) The stored list was received via 3GPP access; 2) the stored list is valid in the PLMN where it was received; 3) the received extended local emergency numbers list was received via non-3GPP access; or 4) the PLMN the received extended local emergency numbers list is received from is different than the PLMN of the stored extended local emergency numbers list.

The first embodiment may include storing a first local emergency numbers list received via a first access at a UE. The UE may then receive a second local emergency numbers list via a second access. When the second access is different from the first access, the UE may discard the second local emergency numbers list without replacing the first local emergency numbers list.

The first local emergency numbers list may be received from a first PLMN and the second local emergency numbers list may be received from a second PLMN, the UE may determine the first PLMN is different than the second PLMN and may discard the second local emergency numbers list.

When the UE stores the first local emergency numbers list, the UE may also store a validity indicator. The UE may discard the second local emergency numbers list when the validity indicator indicates that the first local emergency numbers list is valid in a PLMN where it is received.

The first access may be a 3GPP access and the second access may be a non-3GPP access.

In a second embodiment, a UE may receive a REGISTRATION ACCEPT message with an extended emergency number list IE via non-3GPP access. If a stored extended emergency number list is valid in the PLMN where it is received or the extended emergency number list IE of the REGISTRATION ACCEPT message is valid in the PLMN where it is received, the UE stores the received extended local emergency numbers list in a non-3GPP extended local emergency numbers list.

Subsequently, as an enhancement of the second embodiment, when the UE is connected to a PLMN through non-3GPP access; is not registered to any PLMN through 3GPP access; is not in a limited service state camped on an acceptable cell of any PLMN through 3GPP access; or can determine that the Mobile Country Code (MCC) information of the local emergency numbers received over non-3GPP access corresponds to the country in which the UE is located, then, the UE provides the stored non-3GPP local emergency numbers to upper layers for the detection of UE initiated emergency calls.

Figure 3A:
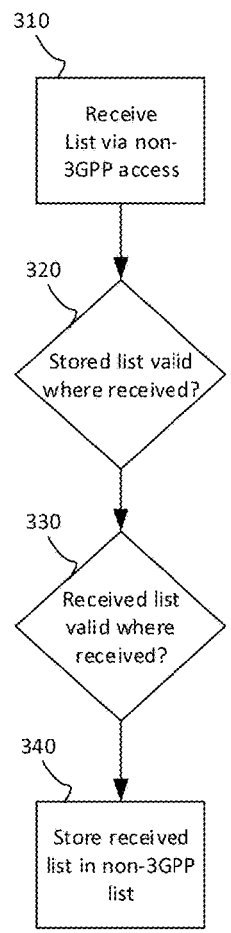
FIG. 3A is a flow diagram of another embodiment of an emergency number storage method.

FIG. 3A is a flow diagram of an alternative of the second embodiment. The flow begins at step 310 when an extended emergency number list is received via non-3GPP access. The UE may determine to store the received extended emergency number list in a non-3GPP list if a presently stored extended emergency number list is valid in the PLMN where it was received or the received extended emergency number list is valid in the PLMN where it is received at steps 320 or 330. In this case, two extended emergency number lists are stored on the UE at step 340.

Figure 3B:
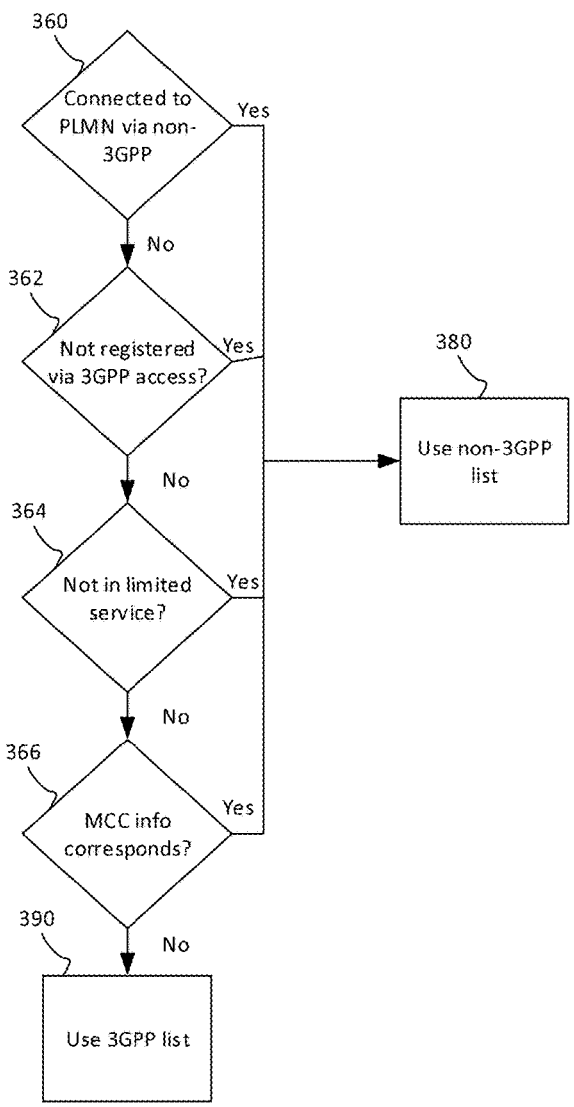
FIG. 3B is an enhancement of the embodiment of FIG. 3B.

FIG. 3B is a flow diagram of the enhancement of the alternative of the second embodiment. Subsequent to the steps of FIG. 3A, at step 380, the non-3GPP list is used for emergency call detection or emergency call setup when any of the following criteria 360, 362, 364, 366 are met; 1) the UE is connected to a PLMN through non-3GPP access; 2) the UE is not registered to any PLMN through 3GPP access; 3) the UE is not in a limited service state camped on an acceptable cell of any PLMN through 3GPP access; or 4) the UE determines that the MCC information of the local emergency numbers stored in the non-3GPP list corresponds to the country in which the UE is located. Otherwise, a list received via 3GPP access may be used at step 390.

In the second embodiment, a UE may store a first local emergency numbers list received via a first access. The UE may then receive a second local emergency numbers list via a second access. If the second access is different from the first access, the UE may store the second local emergency numbers list.

The first local emergency numbers list may be received using one of a NAS registration procedure via the first access or a NAS registration update procedure via the first access; and the second local emergency numbers list may be received using one of the NAS registration procedure via the second access or the NAS registration update procedure via the second access.

The NAS registration procedure via the first access may comprise receiving one of a REGISTRATION ACCEPT message or an ATTACH ACCEPT message; and the NAS registration update procedure via the first access may comprise receiving one of a REGISTRATION ACCEPT message or a TRACKING AREA UPDATE ACCEPT message.

The NAS registration procedure via the second access may comprise receiving a REGISTRATION ACCEPT message; or the NAS registration update procedure via the second access may comprise receiving a REGISTRATION ACCEPT message. The NAS registration procedure may comprise receiving one of a REGISTRATION ACCEPT message or an ATTACH ACCEPT message; and the NAS registration update procedure may comprise receiving one of a REGISTRATION ACCEPT message or a TRACKING AREA UPDATE ACCEPT message.

Storing the first local emergency numbers list may comprise storing an indicator; and storing the second local emergency numbers list may comprise determining that the indicator indicates the first local emergency numbers list is valid in a PLMN where it is received.

The UE may provide the second local emergency numbers list for detection of an emergency number or attempt a UE initiated emergency call or session using the second local emergency numbers list when at least one of the following is true 1) the UE is connected to a first PLMN via the second access; 2) the UE is not registered with any PLMN via the first access; 3) the UE is not in a limited service state; 4) or a country information associated with the second local emergency numbers list matches the country in which the UE is located.

Alternatively, instead of storing a second local emergency numbers list prior to providing the second local emergency numbers list for detection of an emergency number or attempt a UE initiated emergency call or session using the second local emergency numbers list, the UE may conditionally obtain the second local emergency numbers list. The the second local emergency numbers list may be obtained when at least one of the following conditions is true 1) the UE is connected to a first PLMN via the second access; 2) the UE is not registered with any PLMN via the first access; 3) the UE is not in a limited service state; 4) or a country information associated with the second local emergency numbers list matches the country in which the UE is located. The UE may obtain the the second local emergency numbers list by receiving a first message via the second access when at least one of the conditions is true. The UE may send a second message prior to receiving the first message. The first and the second message may be NAS messages. The NAS message may be part of the registration procedure or part of configuration update procedures. Configuration update procedures allow the AMF to update the UE configuration for access and mobility management-related parameters decided and provided by the AMF by providing new parameter information.

The UE may provide the second local emergency numbers list for detection of an emergency number or attempt a UE initiated emergency call or session using the second local emergency numbers list.

The UE may provide the second local emergency numbers list when the emergency service support for non-3GPP access indicator (EMCW) indicates the emergency services are supported over non-3GPP access.

The UE may provide the second local emergency numbers list to the upper layers of the UE. The upper layers of the UE may comprise a layer, for example, including the internet protocol (IP) Multimedia Subsystem (IMS) layer. The upper layer may be above the layer comprising NAS procedures.

In a third embodiment, if a REGISTRATION ACCEPT message is received via non-3GPP access from a PLMN in a different country, the UE may keep the stored local emergency numbers list or stored extended local emergency numbers list (collectively also referred to herein as stored emergency information).

FIG. 4 is a flow diagram of an alternative of the third embodiment. The flow begins at step 410 when the UE receives an extended local emergency numbers list. At step 420, the UE may determine whether country information of the PLMN that sent the extended local emergency numbers list matches the country where the UE is located. At step 430, if the country information does not match, the stored emergency information is not updated or the received emergency information may be discarded.

In the third embodiment, the UE may store a first local emergency numbers list received via a first access. The UE may then receive a second local emergency numbers list via a second access from a PLMN. If the country information associated with the PLMN does not match the country in which the UE is located, the UE may keep the first local emergency numbers list. Additionally, the UE may discard or may not store the second local emergency numbers list. The second access may be a non-3GPP access and the first access may be a 3GPP access.

In an alternative of the third embodiment, the UE may not store a first local emergency numbers list prior to receiving the second local emergency numbers list. The UE may receive the second local emergency numbers list via a second access from a PLMN. If the country information associated with the PLMN does not match the country in which the UE is located, the UE may discard or may not store the second local emergency numbers list. The second access may be a non-3GPP access and the first access may be a 3GPP access.

In a fourth embodiment, If the emergency service support for non-3GPP access indicator (EMCW) in the REGISTRATION ACCEPT message indicates emergency services are not supported over non-3GPP access, the UE may keep or retain or not discard the stored local emergency numbers list or extended local emergency numbers list.

FIG. 5 is a flow diagram of an alternative of the fourth embodiment. The flow begins at step 510 when the UE receives an extended local emergency numbers list. At step 520, the UE may determine whether an EMCW indicator indicates the non-3GPP emergency services are not supported. At step 530, if the EMCW indicator indicates the non-3GPP emergency services are not supported, the stored extended local emergency numbers list is kept.

In the fourth embodiment, the UE may store a first local emergency numbers list received via a first access. The UE may then receive a second local emergency numbers list and an emergency service support for non-3GPP access indicator (EMCW) via a second access. If the EMCW indicates emergency services are not supported over non-3GPP access, the UE may keep the first local emergency numbers list. The UE may discard or may not store the second local emergency numbers list. In some cases, the UE may not store a first local emergency numbers list prior to receiving the second local emergency numbers list. The second access may be a non-3GPP access and the first access may be a 3GPP access.

In a fifth embodiment, if a REGISTRATION ACCEPT message is received via non-3GPP access from a PLMN and the PLMN has MCC information corresponding to the country in which the UE is located and the UE does not have a stored local emergency numbers list or Extended local emergency numbers list received via 3GPP access, the UE may store a second Local emergency numbers list or a second Extended local emergency numbers list if the second Local emergency numbers list or the second Extended local emergency numbers list, respectively, is included in the REGISTRATION ACCEPT message.

FIG. 6 is a flow diagram of the fifth embodiment. The flow begins at step 610 when the UE receives an emergency numbers list form a non-3GPP access. At steps 620 and 630, the UE may determine whether a previously stored list is present and that the received emergency numbers list is from a PLMN with MCC information corresponding to the country in which the UE is located. In this case, if the UE does not have a previously stored emergency numbers list, the UE may store the received emergency number list at step 640.

In the fifth embodiment, a UE may receive first local emergency numbers list via a second access from a PLMN. The UE may then perform a first determination, the first determination comprising determining that a first local emergency numbers list received via a first access is absent. The UE may then perform a second determination, the second determination comprising determining that the country information associated with the PLMN matches the country in which the UE is located. If the first determination and second determination are true, the UE may store the first local emergency numbers list. The second access may be a non-3GPP access and the first access may be a 3GPP access. The UE may further provide the stored first local emergency numbers list to the upper layers of the UE.

In some of the preceding embodiments, if no Extended emergency number list IE is contained in the REGISTRATION ACCEPT message, the ATTACH ACCEPT message or the TRACKING AREA ACCEPT message, then the stored extended local emergency numbers list in the user equipment may be kept, unless the user equipment has successfully registered to a PLMN in a country different from that of the PLMN that sent the stored list.

In addition, in some of the preceding embodiments if the extended emergency number list validity (EENLV) indicator in the extended emergency number list IE indicates that the extended emergency number list is valid in the PLMN where the list is received, then the extended local emergency numbers list may be discarded when the user equipment has successfully registered to a PLMN different from that of the PLMN that sent the list.

In some embodiments, the extended local emergency numbers list received via non-3GPP access may be deleted at switch off. The extended local emergency numbers list received via non-3GPP access need not be deleted upon removal of the USIM.

In some embodiments, the extended emergency number list validity (EENLV) indicator may be known as the extended local emergency number list validity (ELENLV) indicator or otherwise. The extended emergency number list may be known as extended local emergency number list.

The following describes an example combination of the preceding embodiments for the handling of local emergency numbers.

The network may send a local emergency numbers list or an extended local emergency numbers list or both, in the REGISTRATION ACCEPT message, by including the emergency number list IE and the extended emergency number list IE, respectively. The local emergency numbers list can be updated as described in 3GPP TS 24.301, subclause 5.3.7, with the following exceptions:

If the REGISTRATION ACCEPT message is received via non-3GPP access, the message includes a local emergency numbers list or an extended local emergency numbers list or both, and: 1) the PLMN from which the list is received is in a country different from of the country where the UE is located; or 2) the emergency service support for non-3GPP access indicator (EMCW) in the REGISTRATION ACCEPT message indicates emergency services are not supported over non-3GPP access; then the UE discards the lists.

Otherwise, if the REGISTRATION ACCEPT message is received via non-3GPP access, the message includes an extended local emergency numbers list: 1) the EENLV indicator in the extended emergency number list IE indicates that the extended emergency number list is valid in this PLMN where the list is received, the UE may store the extended local emergency numbers list in the extended local emergency numbers list received via non-3GPP access; 2) the extended emergency number list needs to be updated due to receiving it with EMM procedures when the UE is in S1 mode (as described in 3GPP TS 24.301, subclause 5.3.7), the UE may not update the extended local emergency numbers list received via non-3GPP access.

Alternatively, the user equipment may store the local emergency numbers list and the extended local emergency numbers list, as provided by the network. The local emergency numbers list received via 3GPP access stored in the user equipment may be replaced on each receipt of the emergency number list IE received via 3GPP access. The extended local emergency numbers list stored in the user equipment may be replaced on each receipt of the extended emergency number list IE. The received local emergency numbers list or the received extended local emergency numbers list received via 3GPP access or both may be provided to the upper layers.

The emergency number(s) received in the emergency number list IE and the extended emergency number list IE are valid only in networks in the same country as the cell on which this IE is received. If no emergency number list IE or extended emergency number list IE is contained in the REGISTRATION ACCEPT message, then the stored local emergency numbers list received via 3GPP access or stored extended local emergency numbers list received via 3GPP access, respectively, in the user equipment may be kept, except if the user equipment has successfully registered to a PLMN in a country different from that of the PLMN that sent the list. In addition, if the stored extended emergency number list validity (EENLV) indicator in the extended emergency number list IE indicates that the extended emergency number list is valid in this PLMN where the list is received, then the stored extended local emergency numbers list may be discarded when the user equipment has successfully registered to a PLMN different from that of the PLMN that sent this list.

The local emergency numbers list and the extended local emergency numbers list received via 3GPP access may be deleted at switch off and removal of the USIM. The extended local emergency numbers list received via non-3GPP access may be deleted at switch off. The user equipment may be able to store up to ten entries in the local emergency numbers list and up to twenty entries in each of the extended local emergency numbers list, received from the network.

Alternatively, for the use of the local emergency numbers list and the extended local emergency numbers list received via 3GPP access by the UE see 3GPP TS 24.301, subclause 5.3.7. When the UE: has an extended local emergency numbers list received via non-3GPP access; is connected to a PLMN through non-3GPP access; is not registered to any PLMN through 3GPP access; is not in limited service state camped on an acceptable cell of any PLMN through 3GPP access; or can determine that the MCC information of the local emergency numbers received over non-3GPP access corresponds to the country in which the UE is located; then, the UE may provide the extended local emergency numbers list received via non-3GPP access to the upper layers for the detection of UE initiated emergency calls. For the use of the local emergency numbers list and the extended local emergency numbers list received via non-3GPP access by the UE see 3GPP TS 24.301, subclause 5.3.7, with the clarification that the Extended Local Emergency Numbers list is the extended local emergency numbers list received via non-3GPP access.

Figure 7:
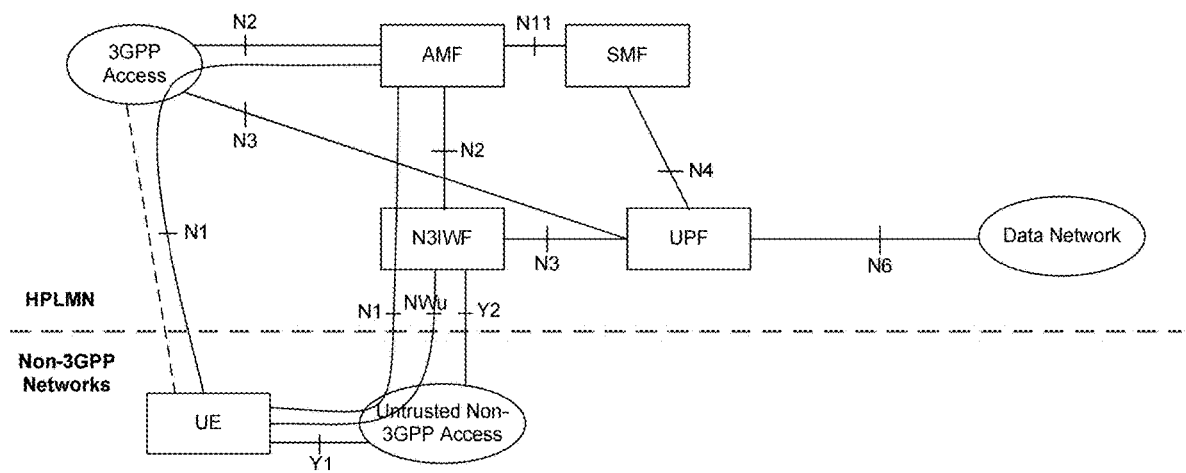
FIG. 7 is a diagram of an embodiment of the 5G network architecture.

FIG. 7 provides an overview of the 5G network architecture. The Access and Mobility Management function (AMF) includes the following functionality. Some or all of the AMF functionalities may be supported in a single instance of an AMF: termination of radio access network (RAN) control plane (CP) interface (N2), termination of non-access stratum (NAS) (N1), NAS ciphering and integrity protection, registration management, connection management, reachability management, mobility management, lawful intercept (LI) (for AMF events and interface to LI System), transparent proxy for routing short message (SM) messages, access authentication, access authorization, security anchor function (SEA)—it interacts with the AUSF and the UE, receives the intermediate key that was established as a result of the UE authentication process. In case of universal subscriber identity module (USIM) based authentication, the AMF retrieves the security material from the authentication server function (AUSF), Security Context Management (SCM)—the SCM receives a key from the SEA that it uses to derive access-network specific keys. Regardless of the number of network functions, there is only one NAS interface instance per access network between the UE and the CN, terminated at one of the network functions that implements at least NAS security and mobility management. In addition to the functionalities of the AMF described above, the AMF may include the following functionality to support non-3GPP access networks: support of N2 interface with non-3GPP Inter-Working Function (N3IWF)—over this interface, some information (e.g., 3GPP cell Identification) and procedures (e.g., Hand-Over related) defined over 3GPP access may not apply, and non-3GPP access specific information may be applied that do not apply to 3GPP accesses support of NAS signaling with a UE over N3IWF. Some procedures supported by NAS signaling over 3GPP access may not be applicable to untrusted non-3GPP (e.g., Paging) access: support of authentication of UEs connected over N3IWF, management of mobility and authentication/security context state(s) of a UE connected via non-3GPP access or connected via 3GPP and non-3GPP accesses simultaneously, support a coordinated RM management context valid over 3GPP and non-3GPP accesses, support dedicated CM management contexts for the UE for connectivity over non-3GPP access. Not all of the functionalities are required to be supported in an instance of a network slice. The Session Management function (SMF) includes the following functionality. Some or all of the SMF functionalities may be supported in a single instance of a SMF. The User plane function (UPF) includes the following functionality. Some or all of the UPF functionalities may be supported in a single instance of a UPF. The Unified Data Management (UDM) supports the following functionality: Authentication Credential Repository and Processing Function (ARPF)—this function stores the long-term security credentials used in authentication for AKA, and stores subscription information. User data repository (UDR) could be present within the UDM. The interaction between UDM and HSS is implementation specific.

Figure 8:
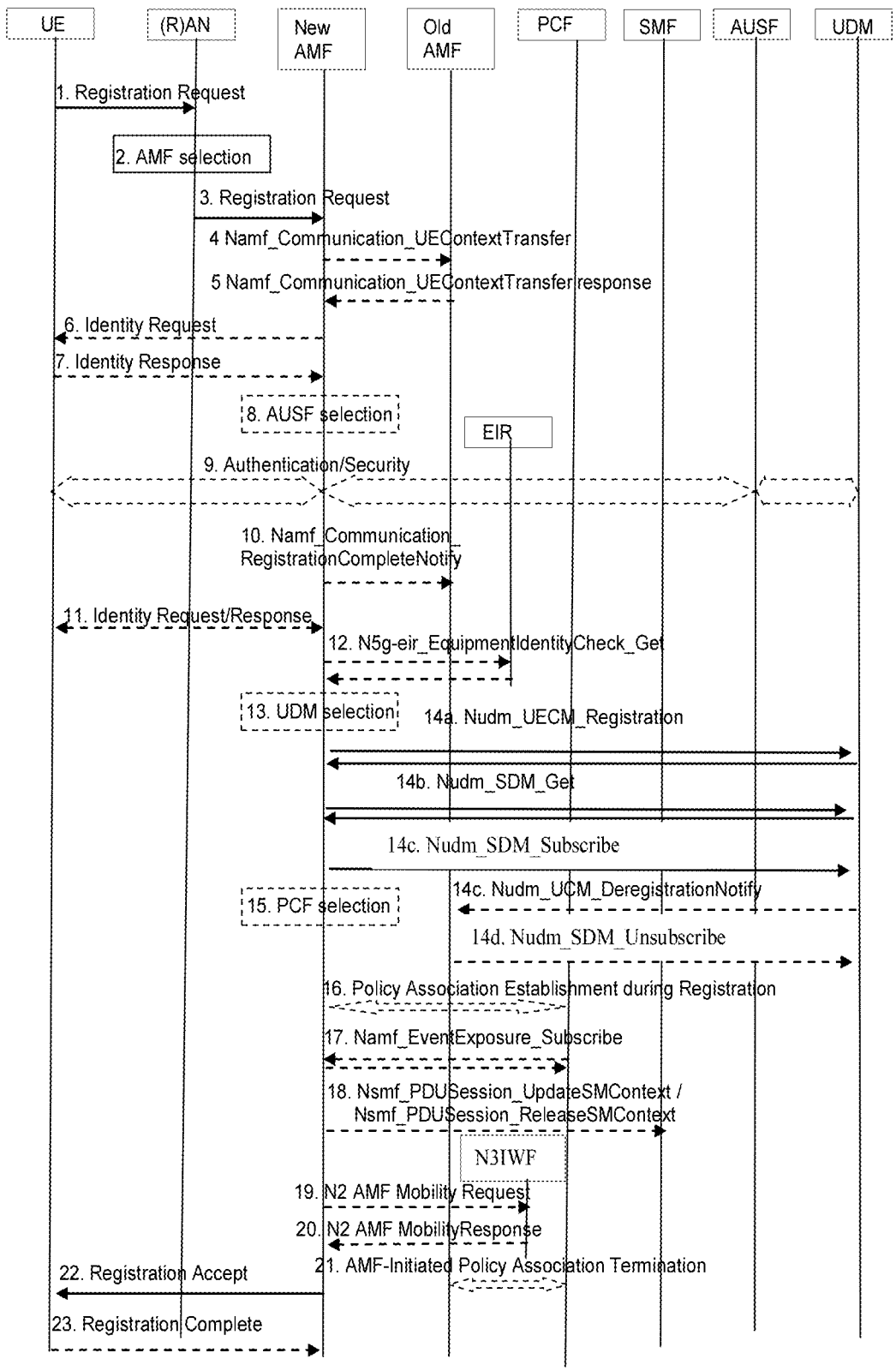
FIG. 8 is a diagram of an embodiment of a registration procedure.

FIG. 8 is a diagram of an embodiment of the registration process in a 5G network. A portion of the steps are described below:

1. UE to (R)AN: AN message (AN parameters, Registration Request (Registration type, SUCI or 5G-GUTI (globally unique temporary identity) or Programmable Event Interface (PEI), last visited TAI (if available), Security parameters, Requested Network Slice Selection Assistance Information (NSSAI), [Mapping Of Requested NSSAI], UE 5GC Capability, PDU Session status, List Of PDU Sessions To Be Activated, Follow on request, MICO mode preference, Requested DRX parameters, UE support of Request Type flag "handover" during the attach procedure) and the list of PSIs).

2. The (R)AN selects an AMF.

3. (R)AN to new AMF: N2 message (N2 parameters, Registration Request (as described in step 1) and UE access selection and PDU session selection information).

When NG-RAN is used, the N2 parameters include the Selected PLMN ID, Location Information, Cell Identity and the RAT type related to the cell in which the UE is camping.

When NG-RAN is used, the N2 parameters also include the Establishment cause.

Mapping Of Requested NSSAI is provided only if available.

If the Registration type indicated by the UE is Periodic Registration Update, then steps 4 to 20 may be omitted.

14a-b. If the AMF has changed since the last Registration procedure, or if the UE provides a SUPI which doesn't refer to a valid context in the AMF, or if the UE registers to the same AMF it has already registered to a non-3GPP access (i.e., the UE is registered over a non-3GPP access and initiates this Registration procedure to add a 3GPP access), the new AMF registers with the UDM using Nudm_UECM_Registration and subscribes to be notified when the UDM deregisters this AMF. The UDM stores the AMF identity associated to the Access Type and does not remove the AMF identity associated to the other Access Type. The UDM may store information provided at registration in UDR, by Nudr_UDM_Update.

The AMF retrieves the Access and Mobility Subscription data, SMF Selection Subscription data and UE context in SMF data using Nudm_SDM_Get. This requires that UDM may retrieve this information from UDR by Nudr_UDM_Query. After a successful response is received, the AMF subscribes to be notified using Nudm_SDM_Subscribe when the data requested is modified, UDM may subscribe to UDR by Nudr_UDM_Subscribe. The GPSI is provided to the AMF in the Access and Mobility Subscription data from the UDM if the GPSI is available in the UE subscription data.

The new AMF provides the Access Type it serves for the UE to the UDM and the Access Type is set to "3GPP access". The UDM stores the associated Access Type together with the serving AMF in UDR by Nudr_UDM_Update.

The new AMF creates an MM context for the UE after getting the Access and Mobility Subscription data from the UDM.

For an Emergency Registration in which the UE was not successfully authenticated, the AMF may not register with the UDM.

For an Emergency Registration, the AMF may not check for access restrictions, regional restrictions or subscription restrictions. For an Emergency Registration, the AMF may ignore any unsuccessful registration response from the UDM and continue with the Registration procedure.

14c. When the UDM stores the associated Access Type (e.g., 3GPP) together with the serving AMF as indicated in step 14a, it will cause the UDM to initiate a Nudm_UCM_DeregistrationNotify to the old AMF corresponding to the same (e.g., 3GPP) access, if one exists. The old AMF removes the MM context of the UE. If the serving NF removal reason indicated by the UDM is Initial Registration, then the old AMF invokes the Nsmf_PDUSession_UpdatedSMContext/Nsmf_PDUSession_ReleaseSMContext (SUPI, PDU Session ID) service operation towards all the associated SMF(s) of the UE to notify that the UE is deregistered from the old AMF. The SMF(s) may release the PDU Session on receiving this notification.

14d. The old AMF unsubscribes with the UDM for subscription data using Nudm_SDM_Unsubscribe.

22. New AMF to UE: Registration Accept (5G-GUTI, Registration Area, Mobility restrictions, PDU Session status, Allowed NSSAI, [Mapping Of Allowed NSSAI], [Configured NSSAI for the Serving PLMN], [Mapping Of Configured NSSAI], Periodic Registration Update timer, LADN Information and accepted MICO mode, IMS Voice over PS session supported Indication, Emergency Service Support indicator, Accepted DRX parameters, Network support of Interworking without N26).

SIP is a protocol that is used for session creation, management, and deletion. It is a textual protocol that is defined in RFC 3261 and has been further expanded over the years to include new functionality. Sessions are directed by means of a URI, either a SIP URI that has a format that looks like username@domain where both username and domain can consist of one to many multiple labels that can be separated by a full stop or explanation mark. Or URI can be a tel URI which is basically an encoded telephone number.

When an emergency call is made a specific uniform resource identifier (URI) is used so that the network can recognize that the call is emergency in nature. It may have a label of "sos" in it and this URI maybe called a uniform resource name (URN).

Figure 9:
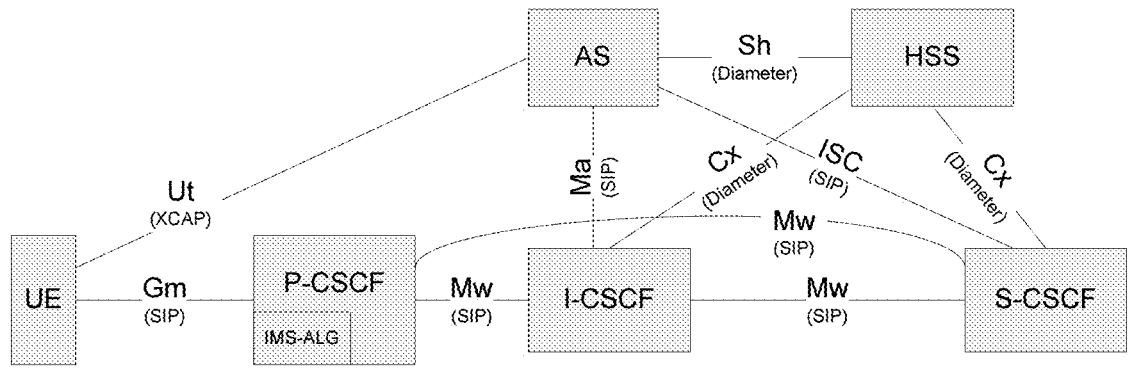
FIG. 9 is a diagram of an embodiment of an internet protocol (IP) Multimedia Subsystem (IMS).

In 3GPP session initiation protocol (SIP) is used within an internet protocol (IP) Multimedia Subsystem (IMS). FIG. 9 is a block diagram of IMS. An IMS network can for example be supported by EPC connected to E-UTRAN or 5GC connected to non-3GPP access or NG-RAN. An IMS network consists of a number of functional elements, some of which are described below.

P-CSCF: Proxy Call Session Control Function. It is the first point of entry into the IMS network.

S-CSCF: Serving Call Session Control Function. This handles the sessions in the network and routes SIP messages to appropriate IMS AS's and P-CSCF's.

I-CSCF: Interrogating Call Session Control Function. It is used as entry point to find a subscriber in the network and assist in assigning S-CSCF when a subscriber registers in the network.

AS: Application Server. This function typically provides service specific functionality. Some examples of AS's include:

TAS: MMTel AS. This is typically used to provide service logic and control for telephony services e.g. voice, video, etc.

SCC AS: Service Centralization and Continuity AS. This is typically used to provide service logic and control for centralizing services between CS and IMS in the IMS and handing over of SIP sessions and their associated media between UEs and/or across different IP networks.

HSS: Home Subscriber Server. This is the database that contains the subscriber's profile (identities, what services they have subscribed to), and provides location functionality as well at the necessary authentication database.

IMS AS: The IMS Application server. This has the logic/software that executes services for an IMS subscriber. There may be 0 to many of these in the network.

Figure 10:
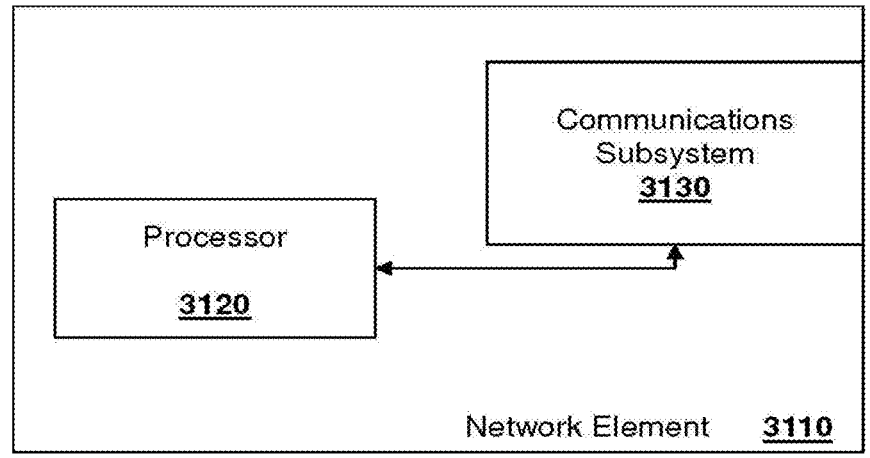
FIG. 10 is a diagram of an embodiment of a network element.

The various methods or operations described herein may be implemented by a network element. An example network element is shown with regard to FIG. 10. In FIG. 10, network element 3110 includes a processor 3120 and a communications subsystem 3130, where the processor 3120 and communications subsystem 3130 cooperate to perform the methods or operations previously described.

Figure 11:
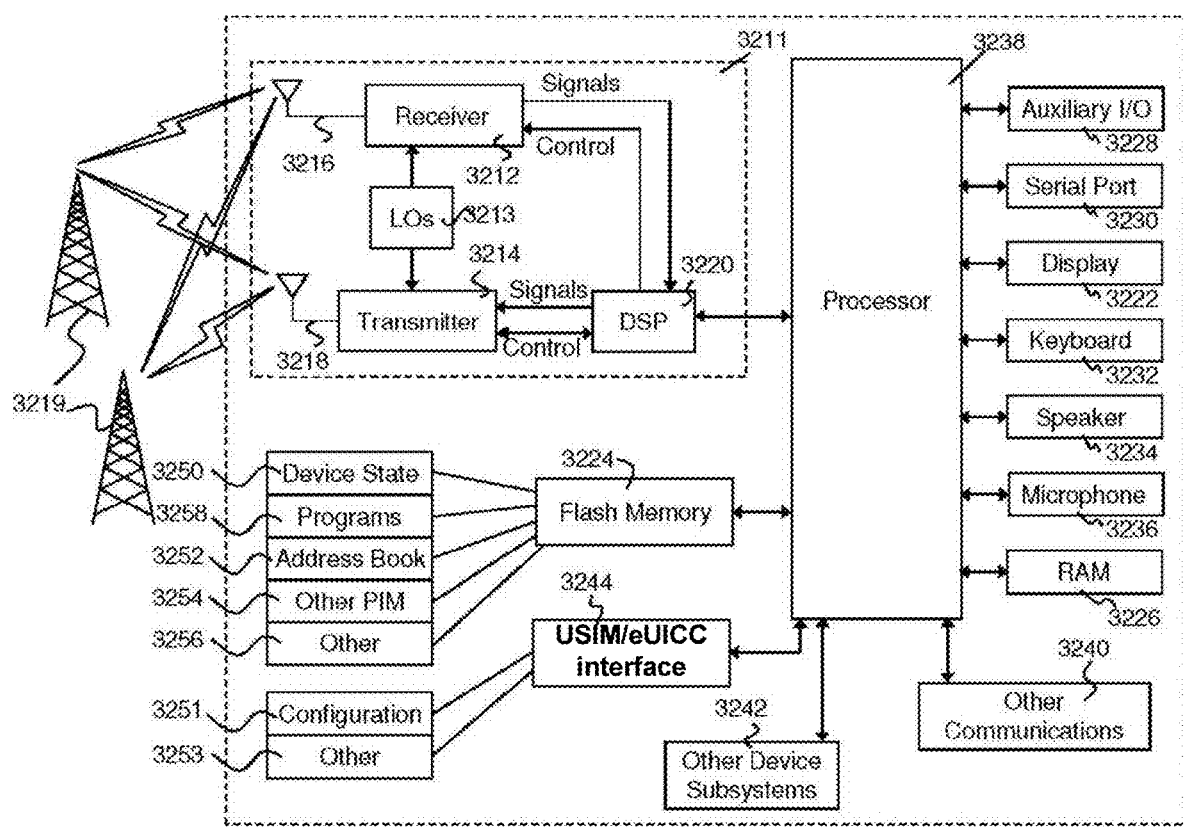
FIG. 11 is a diagram of an embodiment of a communications device.

Further, the various methods or operations described herein may be implemented by a communications device (e.g., UEs, network nodes, TEs, etc.). An example of a communications device is described below with regard to FIG. 11. The communications device 3200 may comprise a two-way wireless communication device having voice and data communication capabilities. In some embodiments, voice communication capabilities are optional. The communications device 3200 may have the capability to communicate with other computer systems on the Internet. Depending on the exact functionality provided, the communications device 3200 may be referred to as a data messaging device, a two-way pager, a wireless e-mail device, a cellular telephone with data messaging capabilities, a wireless internet appliance, a wireless device, a smart phone, a mobile device, or a data communication device, as examples.

Where the communications device 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. The particular design of the communication subsystem 3211 may be dependent upon the communication network 3219 in which the communications device 3200 is intended to operate.

Network access may also vary depending upon the type of communication network 3219. In some networks, network access is associated with a subscriber or user of the communications device 3200. The communications device 3200 may use a USIM or eUICC in order to operate on a network. The USIM/eUICC interface 3244 is typically similar to a card slot into which a USIM/eUICC card may be inserted. The USIM/eUICC card may have memory and may hold many key configurations 3251 and other information 3253, such as identification and subscriber-related information.

When network registration or activation procedures have been completed, the communications device 3200 may send and receive communication signals over the communication network 3219. As illustrated, the communication network 3219 may comprise multiple base stations communicating with the communications device 3200.

Signals received by antenna element 3216 through communication network 3219 are input to receiver 3212, which may perform such common receiver functions such as signal amplification, frequency down conversion, filtering, channel selection, and the like. Analog to digital (A/D) conversion of a received signal allows more complex communication functions, such as demodulation and decoding to be performed in the DSP 3220. In a similar manner, signals to be transmitted are processed, including modulation and encoding for example, by DSP 3220 and are input to transmitter 3214 for digital to analog (D/A) conversion, frequency up conversion, filtering, amplification, and transmission over the communication network 3219 via antenna element 3218. DSP 3220 not only processes communication signals but also provides for receiver and transmitter control. For example, the gains applied to communication signals in receiver 3212 and transmitter 3214 may be adaptively controlled through automatic gain control algorithms implemented in DSP 3220.

The communications device 3200 generally includes a processor 3238 which controls the overall operation of the device. Communication functions, including data and voice communications, are performed through communication subsystem 3211 in cooperation with the processor 3238. Processor 3238 also interacts with further device subsystems such as the display 3222, flash memory 3224, random access memory (RAM) 3226, auxiliary input/output (I/O) subsystems 3228, serial port 3230, one or more user interfaces such as keyboards or keypads 3232, speaker 3234, microphone 3236, one or more other communication subsystems 3240 such as a short-range communications subsystem, and any other device subsystems generally designated as 3242. While the other communication subsystems 3240 and other device subsystems 3242 are depicted as separate components in FIG. 10, it is to be understood that other communication subsystems 3240 and other device subsystems 3242 (or parts thereof) may be integrated as a single component. Serial port 3230 may include a USB port or other port currently known or developed in the future.

Some of the illustrated subsystems perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions, such as a calculator or task list.

Operating system software used by the processor 3238 may be stored in a persistent store such as flash memory 3224, which may instead be a read-only memory (ROM) or similar storage element (not shown). The operating system, specific device applications, or parts thereof, may be temporarily loaded into a volatile memory such as RAM 3226. Received communication signals may also be stored in RAM 3226.

As shown, flash memory 3224 may be constituted by different areas for both computer programs 3258 and program data storage 3250, 3252, 3254, and 3256. These different storage types indicate that each program may allocate a portion of flash memory 3224 for their own data storage use. Processor 3238, in addition to its operating system functions, may enable execution of software applications on the communications device 3200. A predetermined set of applications that control basic operations, including at least data and voice communication applications for example, may typically be installed on the communications device 3200 during manufacturing. Other applications may be installed subsequently or dynamically.

Applications and software may be stored on any computer-readable storage medium. The computer-readable storage medium may be tangible or in a transitory/non-transitory medium such as optical (e.g., CD, DVD, etc.), magnetic (e.g., tape), or other memory currently known or developed in the future.

Software applications may be loaded onto the communications device 3200 through the communication network 3219, an auxiliary I/O subsystem 3228, serial port 3230, other short-range communications subsystem(s) 3240, or any other suitable device subsystem(s) 3242, and installed by a user in the RAM 3226 or a non-volatile store (not shown) for execution by the processor 3238. Such flexibility in application installation may increase the functionality of the communications device 3200 and may provide enhanced on-device functions, communication-related functions, or both. For example, secure communication applications may enable electronic commerce functions and other such financial transactions to be performed using the communications device 3200.

In a data communication mode, a received signal such as a text message or web page download may be processed by the communication subsystem 3211 and input to the processor 3238, which may further process the received signal for output to the display 3222, or alternatively to an auxiliary I/O device 3228.

For voice communications, overall operation of the communications device 3200 is similar, except that received signals may typically be output to a speaker 3234 and signals for transmission may be generated by a microphone 3236. Alternative voice or audio I/O subsystems, such as a voice message recording subsystem, may also be implemented on the communications device 3200. Although voice or audio signal output may be accomplished primarily through the speaker 3234, display 3222 may also be used to provide an indication of the identity of a calling party, the duration of a voice call, or other voice call-related information, for example.

Serial port 3230 may be implemented in a personal digital assistant (PDA)-type device for which synchronization with a user's desktop computer (not shown) may be desirable, but such a port is an optional device component. Such a serial port 3230 may enable a user to set preferences through an external device or software application and may extend the capabilities of the communications device 3200 by providing for information or software downloads to the communications device 3200 other than through a wireless communication network 3219. The alternate download path may, for example, be used to load an encryption key onto the communications device 3200 through a direct and thus reliable and trusted connection to thereby enable secure device communication. Serial port 3230 may further be used to connect the device to a computer to act as a modem.

Other communications subsystems 3240, such as a short-range communications subsystem, are further optional components which may provide for communication between the communications device 3200 and different systems or devices, which need not necessarily be similar devices. For example, one or more other communications subsystems 3240 may include an infrared device and associated circuits and components or a Bluetooth™ communication module to provide for communication with similarly enabled systems and devices. Other communications subsystems 3240 may further include non-cellular communications such as WI-FI, WiMAX, near field communication (NFC), BLUETOOTH, ProSe (Proximity Services) (e.g., sidelink, PC5, D2D, etc.), and/or radio frequency identification (RFID). The other communications subsystem(s) 3240 and/or other device subsystem(s) 3242 may also be used to communicate with auxiliary devices such as tablet displays, keyboards, or projectors.

Figure 12:
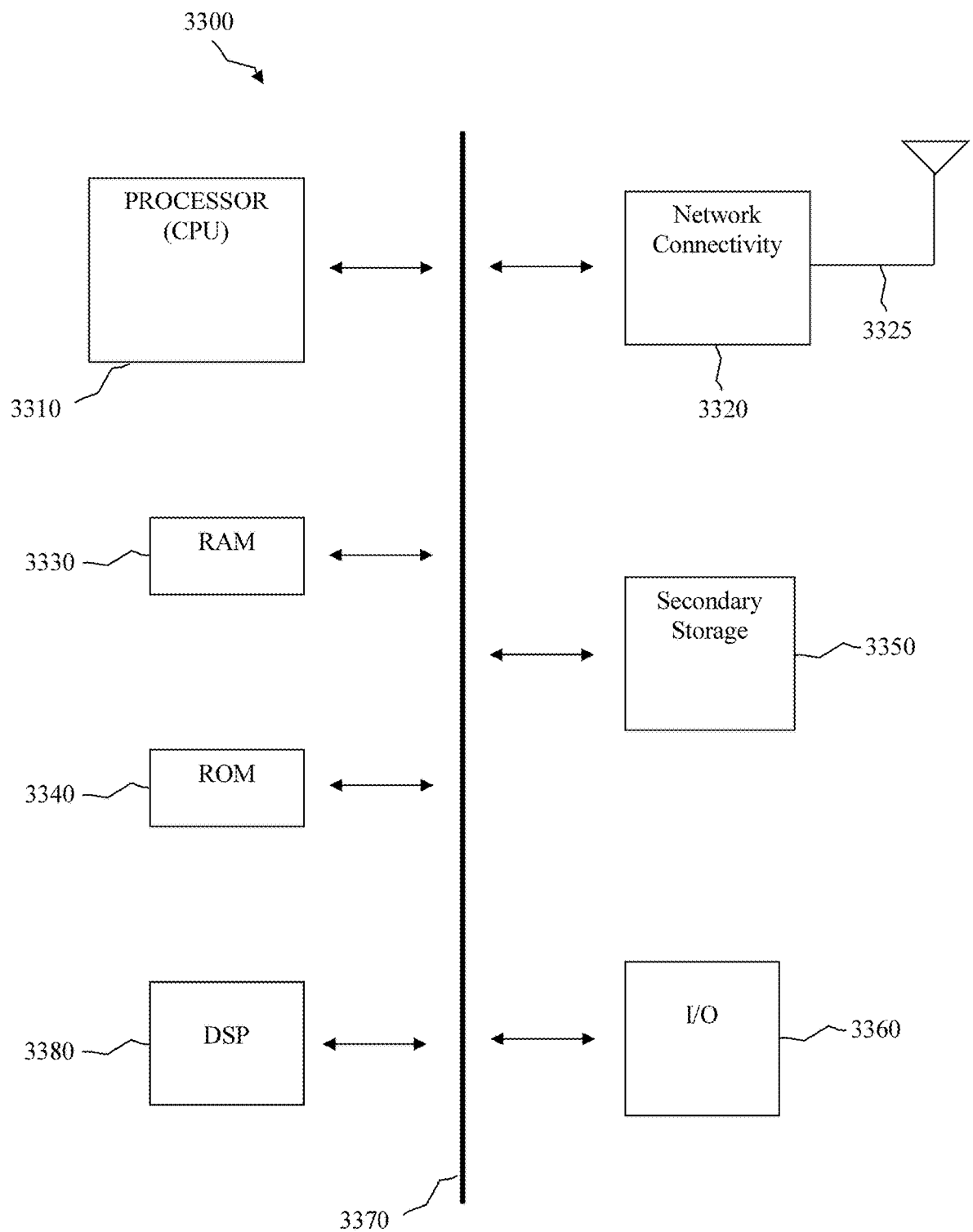
FIG. 12 is a diagram of an embodiment of a system suitable for implementing one or more embodiments disclosed herein.

The communications device 3200 and other components described above might include a processing component that is capable of executing instructions related to the actions described above. FIG. 12 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, ethernet devices, universal serial bus (USB) interface devices, serial interfaces, token ring devices, wireless local area network (WLAN) devices, radio transceiver devices such as code division multiple access (CDMA) devices, Global System for Mobile communication (GSM) radio transceiver devices, universal mobile telecommunications system (UMTS) radio transceiver devices, LTE radio transceiver devices, new generation radio transceiver devices, worldwide interoperability for microwave access (WiMAX) devices, and/or other well-known devices for connecting to networks. These network connectivity devices 3320 may enable the processor 3310 to communicate with the internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver component 3325 might be considered to be a component of the I/O devices 3360 instead of or in addition to being a component of the network connectivity devices 3320.

The following are incorporated herein by reference for all purposes: 3GPP TS 24.501, 3GPP TS 24.301, 3GPP TS23.167, 3GPP TS23.501, 3GPP TS27.007, 3GPP TS23.003, 3GPP TS22.101, and 3GPP TS31.102.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method in a user equipment (UE) supporting registration using third generation partnership project (3GPP) access and using non-3GPP access, the method comprising:
   storing, by the UE, first emergency information received using first registration procedures with a first public land mobile network (PLMN), the first emergency information comprising a first extended local emergency number list, and the first emergency information received from the first PLMN;
   receiving, by the UE, a REGISTRATION ACCEPT message using second registration procedures with a second PLMN via non-3GPP access, the REGISTRATION ACCEPT message excluding an extended local emergency number list; and
   discarding, by the UE, the first emergency information after receiving the REGISTRATION ACCEPT message from the second PLMN if at least one condition of one or more conditions is met, wherein a first condition of the one or more conditions comprises the UE having received the REGISTRATION ACCEPT message from the second PLMN that is in a country different from the country of the first PLMN.

2. The method of claim 1, wherein the first emergency information further comprises an extended emergency number list validity (EENLV) indicator comprising a first indication, and the first indication indicates that the first extended local emergency number list is valid in the first PLMN where the list is received.

3. The method of claim 2, wherein a second condition of the one or more conditions comprises the UE having received the REGISTRATION ACCEPT message from the second PLMN different from the first PLMN.

4. The method of claim 1, wherein discarding the first emergency information if at least one condition of the one or more conditions is met comprises keeping the first emergency information unless at least one condition of the one or more conditions is met.

5. The method of claim 1, wherein the registration procedures with the first PLMN comprise registration procedures via 3GPP access.

6. The method of claim 1, further comprising storing, by the UE, an indication of an access type via which the first emergency information was received.

7. The method of claim 6, wherein a third condition of the one or more conditions comprises the indication of the access type matching non-3GPP access.

8. The method of claim 1, wherein the first registration procedures comprise registering a presence of the UE by means of at least one of a tracking area update procedure, an attach procedure in the evolved packet system (EPS), or a registration procedure in the 5G system (5GS).

9. The method of claim 1, wherein the second registration procedures comprise registering a presence of the UE by means of a registration procedure in the 5G system (5GS).

10. A user equipment (UE) supporting registration using third generation partnership project (3GPP) access and using non-3GPP access, the UE comprising:
 a memory; and
 a processor coupled to the memory, the processor configured to:
  store first emergency information received using first registration procedures with a first public land mobile network (PLMN), the first emergency information comprising a first extended local emergency number list, and the first emergency information received from the first PLMN;
  receive a REGISTRATION ACCEPT message using second registration procedures with a second PLMN via non-3GPP access, the REGISTRATION ACCEPT message excluding an extended local emergency number list; and
  discard the first emergency information after receiving the REGISTRATION ACCEPT message from the second PLMN if at least one condition of one or more conditions is met,
  wherein a first condition of the one or more conditions comprises the UE having received the REGISTRATION ACCEPT message from the second PLMN that is in a country different from the country of the first PLMN.

11. The UE of claim 10, wherein the first emergency information further comprises an extended emergency number list validity (EENLV) indicator comprising a first indication, and the first indication indicates that the first extended local emergency number list is valid in the first PLMN where the list is received.

12. The UE of claim 11, wherein a second condition of the one or more conditions comprises the UE having received the REGISTRATION ACCEPT message from the second PLMN different from the first PLMN.

13. The UE of claim 10, wherein discarding the first emergency information if at least one condition of the one or more conditions is met comprises keeping the first emergency information unless at least one condition of the one or more conditions is met.

14. The UE of claim 10, further comprising storing, by the UE, an indication of an access type via which the first emergency information was received, wherein a third condition of the one or more conditions comprises the indication of the access type matching non-3GPP access.

15. The UE of claim 10, wherein the first registration procedures comprise registering a presence of the UE by means of at least one of a tracking area update procedure, an attach procedure in the evolved packet system (EPS), or a registration procedure in the 5G system (5GS).

16. A non-transitory computer readable medium comprising instructions that when executed by a user equipment (UE) supporting registration using third generation partnership project (3GPP) access and using non-3GPP access, cause the UE to:
 store first emergency information received using first registration procedures with a first public land mobile network (PLMN), the first emergency information comprising a first extended local emergency number list, and the first emergency information received from the first PLMN;
 receive a REGISTRATION ACCEPT message using second registration procedures with a second PLMN via non-3GPP access, the REGISTRATION ACCEPT message excluding an extended local emergency number list; and
 discard the first emergency information after receiving the REGISTRATION ACCEPT message from the second PLMN if at least one condition of one or more conditions is met,
 wherein a first condition of the one or more conditions comprises the UE having received the REGISTRATION ACCEPT message from the second PLMN that is in a country different from the country of the first PLMN.

17. The non-transitory computer readable medium of claim 16, wherein the first emergency information further comprises an extended emergency number list validity (EENLV) indicator comprising a first indication, wherein the first indication indicates that the first extended local emergency number list is valid in the first PLMN where the list is received, and wherein a second condition of the one or more conditions comprises the UE having received the REGISTRATION ACCEPT message from the second PLMN different from the first PLMN.

18. The non-transitory computer readable medium of claim 16, wherein discarding the first emergency information if at least one condition of the one or more conditions is met comprises keeping the first emergency information unless at least one condition of the one or more conditions is met.

19. The non-transitory computer readable medium of claim 16, wherein the first registration procedures comprise registering a presence of the UE by means of at least one of a tracking area update procedure, an attach procedure in the evolved packet system (EPS), or a registration procedure in the 5G system (5GS).

20. The non-transitory computer readable medium of claim 16, wherein the registration procedures with the first PLMN comprise registration procedures via 3GPP access, and wherein the second registration procedures comprise registering a presence of the UE by means of a registration procedure in the 5G system (5GS).

* * * * *